L. GRANIERI.
ROAD VEHICLE WHEEL AXLE.
APPLICATION FILED MAY 12, 1908.

903,080.

Patented Nov. 3, 1908.

UNITED STATES PATENT OFFICE.

LUIGI GRANIERI, OF ROME, ITALY, ASSIGNOR TO THE FIRM OF A. G. E. S. SOCIETÀ IN ACCOMANDITA SEMPLICE PER l'ESERCIZIO DEI BREVETTI GRANIERI, OF ROME, ITALY.

ROAD-VEHICLE WHEEL-AXLE.

No. 903,080.     Specification of Letters Patent.     Patented Nov. 3, 1908.

Application filed May 12, 1908. Serial No. 432,475.

*To all whom it may concern:*

Be it known that I, LUIGI GRANIERI, a subject of the King of Italy, residing at Rome, Italy, mechanical engineer, have invented certain new and useful Improvements in and Relating to Road-Vehicle Wheel-Axles.

The object of the present invention is to provide a road vehicle wheel axle which differs from those known by its not being of one piece but having independent journals connected to the main tree by pivoted parallelograms which in turn are elastically connected to each other.

Figure 1:
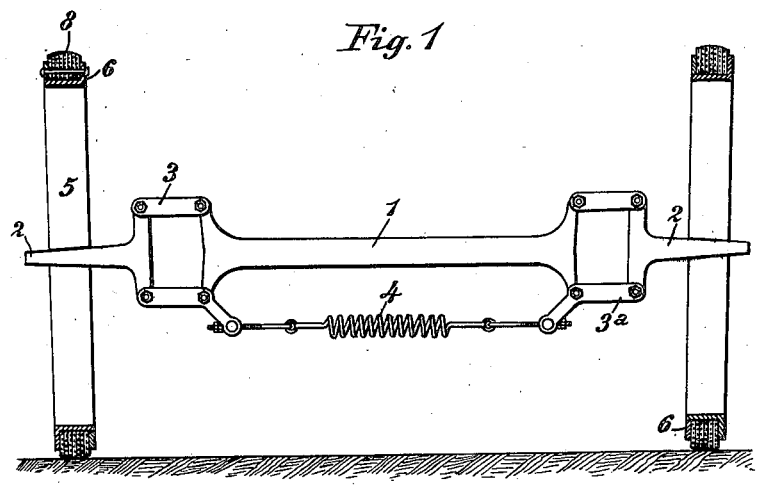
Figure 2:
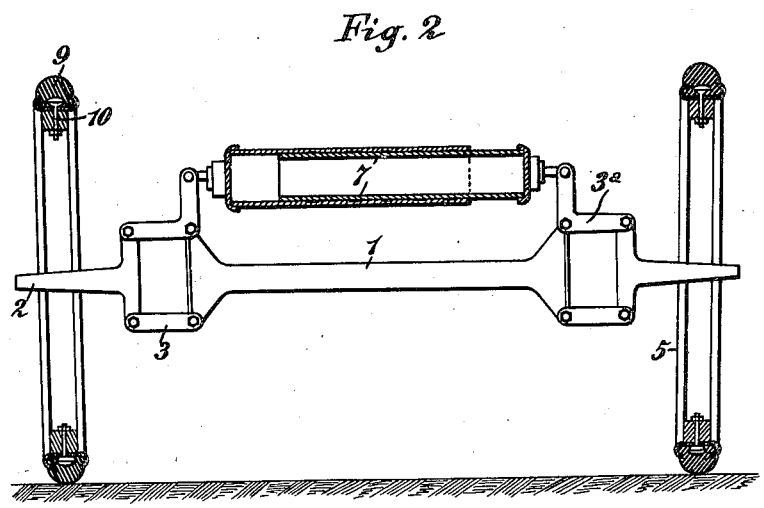

The annexed drawings show two examples of the invention, Figure 1 being a partially sectional view of a form of the invention in which the elastic connection between the pivoted parallelograms consists in a spring device, while Fig. 2 is a similar view of a form of the invention in which such elastic connection consists in air cylinders.

In the said drawing, 1 is the main axle tree, 2 the journals, 3 the pivoted parallelograms, 4 the reaction spring, 5 the road wheel, 6 the rims, 7 the air cushioning device, 8 a solid tire comprising say a plurality of leather bands or layers, 9 a rubber tire fixed to the rim or hoop by bolts 10.

The purpose of the above described device is to do away with pneumatic tires for road and motor vehicles, and replace them advantageously by the elastic spring or air cushioning device as shown.

—3ª— are rigid angular extensions of the pivoted parallelograms 3, and between the said extensions the elastic connection 4 is inserted which in the form shown in Fig. 1 is a spring link, while in Fig. 2 it consists in two air cylinders sliding almost but not perfectly tightly the one within the other.

The operation of the device is obvious. The shocks from the unevennesses of the road are transmitted from the elastic treads or tires 8 or 9 to the axle journals 2 and from the latter to the deformable pivoted parallelograms 3 which in turn transmit them to the cushioning devices 4 or 7, respectively, by which they are taken up and absorbed.

As by the above described shock cushioning device the pneumatic tires are done away with, as stated, the rims of the wheels instead of a simple flat iron hoop may comprise a hoop with a groove having a laterally removable side such as to be capable of inserting therein a series of radially arranged leather rings or layers of an elastic material; or other antislipping and shock cushioning means.

It is understood that the two forms set forth are merely illustrative, as any elastic connecting link or means between the two deformable pivoted parallelograms may be used within the scope of the present invention.

Having now fully described my said invention and the manner in which the same is to be performed, what I claim and desire to protect by Letters Patent of the United States, is:—

1. Elastic axle-tree for road vehicle wheels such as described, comprising in combination axle journals, deformable pivoted parallelograms connected to the said journals, rigid angular extensions of the said parallelograms and elastic connection between the said extensions of the said parallelograms.

2. Elastic axle-tree for road vehicle wheels such as described, comprising in combination axle journals, deformable pivoted parallelograms connected to the said journals, rigid angular extensions of the said parallelograms and an air cushioning device connecting the said extensions of the said parallelograms.

3. Elastic axle-tree for road vehicle wheels such as described, comprising in combination axle journals, deformable pivoted parallelograms connected to the said journals, rigid angular extensions of the said parallelograms and a spring connecting the said extensions of the said parallelograms.

4. Elastic axle-tree for road vehicle wheels such as described, comprising in combination axle journals, deformable pivoted parallelograms connected to the said journals, rigid angular extensions of the said parallelograms and two air cylinders sliding almost but not perfectly tightly the one within the other, connecting the said extensions of the said parallelograms.

In testimony whereof I have affixed my signature in presence of two witnesses.

LUIGI GRANIERI.

Witnesses:
    DIULIO NARDORI,
    PAGO CENTUNEO.